Nov. 12, 1929.                R. WORDEN                    1,735,707
                              CRANK SHAFT
                          Filed Nov. 30, 1927
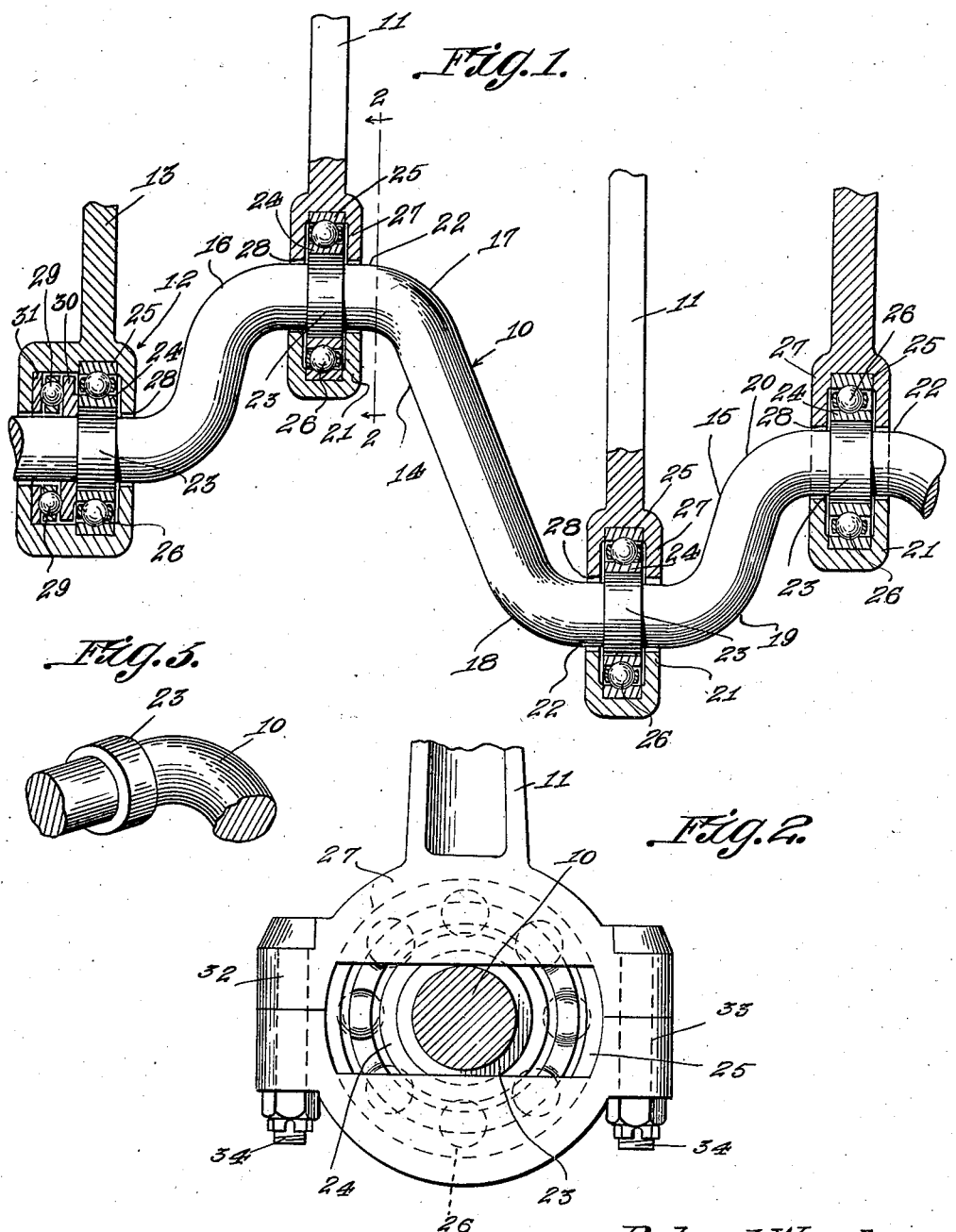
Robert Worden,
INVENTOR
BY Victor J. Evans
ATTORNEY Patented Nov. 12, 1929

1,735,707

UNITED STATES PATENT OFFICE

ROBERT WORDEN, OF LANSING, MICHIGAN

CRANK SHAFT

Application filed November 30, 1927. Serial No. 236,872.

The present invention relates to crank shafts and has for its objects to provide a a crank shaft upon which the crank arm bearings may be slid into operative position thereon or dismounted therefrom without in any way changing the construction of the crank shaft.

Further objects are to facilitate the mounting and dismounting of ball bearings or anti-friction bearings upon the crank shaft without changing the construction of said crank shaft.

Other objects are simplicity of construction, cheapness of manufacture and effectiveness in use and in construction.

Other objects and advantages will appear from the subjoined specification and will be set forth in the appended claim.

In the drawings:—

Figure 1 represents a portion of a crank shaft in accordance with my invention and illustrating all the inventive features connected therewith.

Figure 2 is a section on line 2—2 of Figure 1 looking in the direction of the arrows and showing the connection of the crank arm with the crank shaft on an enlarged scale.

Figure 3 is a fragmentary view of a portion of the crank shaft showing one of the collars attached to the crank shaft.

Referring to the drawings in detail, 10 designates the crank shaft, 11 are pitmen operated thereby, 12 is a housing secured to the crank case 13 and provided with ball bearings and with thrust ball bearings for holding the crank in place. The crank 10 is formed with a plurality of crank portions 14 and 15 extending in opposite directions, the bends thereof being in the form of curves 16, 17, 18, 19 and 20 so that the eyes 21 of the pitmen may be readily slid past the bends and into position on the flattened portion 22 of the crank, said flattened portions being provided with raised collars 23 secured thereto against rotary or longitudinal movement thereon. Mounted upon said collars are rings 24 which fit snugly thereupon against movement relative thereto, said rings forming with rings 25 raceways for the ball bearings 26 within the housing 27 at the ends of the crank arms 11, said housing having apertures at 28 for the reception therethrough of the crank arm 10. Portions of the crank arms are rotatably mounted in the journaled boxes 12 having anti-friction bearings 26 such as described above therein and thrust bearings 29 comprising a thrust collar 30 and a thrust element 31 on either side of the thrust ball bearings 29 to prevent endwise movement on the crank 10.

The assembly of the device is as follows: When it is desired to place crank arms with bearings as described above on the crank shaft, the bearings are first slid from one end of the crank arm thereon past one end of the curved portions 16—17—18—19— and 20 into position on the respective crank portions 22 which are flattened as stated above. The crank arms are then secured to the bearings in the usual manner by attaching the parts 32 and 33 together about said bearings by means of bolts 34. Disassembly of these parts, of course, would be the reverse movement thereon and would be accomplished in a similar manner.

Having described my invention, what I claim is:—

A crank shaft round in section having bends forming multiple cranks, fixed collars in the cranks, divided pitmen having circular flanges overlapping the periphery of the collars, and ball bearings housed in the pitmen to form anti-friction bearing on the collars.

In testimony whereof I affix my signature.

ROBERT WORDEN.